United States Patent
Diekhans

(10) Patent No.: US 6,205,384 B1
(45) Date of Patent: Mar. 20, 2001

(54) SYSTEM FOR SETTING OPERATING PARAMETERS OF A HARVESTING MACHINE

(75) Inventor: Norbert Diekhans, Gütersloh (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/224,752

(22) Filed: Jan. 4, 1999

(30) Foreign Application Priority Data

Jan. 7, 1998 (DE) .................................................. 198 00 238

(51) Int. Cl.⁷ .............................. G06F 7/70; G06F 19/00
(52) U.S. Cl. .......................... 701/50; 701/25; 172/4.5; 172/9
(58) Field of Search ................................. 701/24, 25, 33, 701/50; 172/4.5, 9; 56/10.1, 10.2 R, 14.9, 15.3, 15.5, 15.6, 15.7; 180/900; 340/459

(56) References Cited

U.S. PATENT DOCUMENTS

| | | | |
|---|---|---|---|
| 3,693,332 | * 9/1972 | Bobard | 56/15.6 |
| 4,159,749 | * 7/1979 | Boushek | 180/308 |
| 4,337,611 | 7/1982 | Mailander et al. | |
| 4,527,241 | 7/1985 | Sheehan et al. | 701/50 |
| 4,590,739 | * 5/1986 | Abatti et al. | 53/391 |
| 5,488,817 | * 2/1996 | Paquet et al. | 56/10.2 R |
| 5,666,793 | 9/1997 | Bottinger | |
| 5,712,782 | 1/1998 | Weigelt et al. | 701/50 |

FOREIGN PATENT DOCUMENTS

| | | |
|---|---|---|
| 17 80 719 | 4/1977 | (DE). |
| 289 686 | 10/1983 | (DE). |
| 0 586 999 A2 | 9/1992 | (EP) ............................. G05B/13/02 |

OTHER PUBLICATIONS

Copy of article "Gesteuerte adaptive Regelung einer Mähdrescher–Reiningungsanlage" published in "Grundlagen der Landtechnick" Magazine, Band 36 (1986) Nr. 3, pp. 73–78.
*Standardized Microcontroller for Automation Tasks in Agriculture*, N. Diekhans, Berlin, Oct. 24–26, 1990.

* cited by examiner

Primary Examiner—William A. Cuchlinski, Jr.
Assistant Examiner—Gertrude Arthur
(74) Attorney, Agent, or Firm—Husch & Eppenberger, LLC; Robert E. Muir; Kevin M. Kercher

(57) ABSTRACT

A system is described for setting a self-propelled harvesting machine having several machine components with respectively adjustable parameters wherein setting of these parameters takes into account external harvesting conditions. Means are provided for manually inputting and/or automatically detecting the external harvesting conditions for the particular harvesting application. Furthermore at least one storage means is provided for storing the machine parameters for the respective harvesting application and for different external harvesting conditions. Also, if the occasion arises, the storage means may take into account at least one target standard. The stored machine parameters for setting the harvesting machine can be called up from the storage means after the system knows the respective external harvesting conditions and, if necessary, the respective target standard.

6 Claims, 4 Drawing Sheets

| | | | | |
|---|---|---|---|---|
| | $EB_1^1, EB_2^1, ..., EB_M^1$ | $EB_1^2, EB_1^2, ..., EB_M^2$ | $EB_1^3, EB_1^3, ..., EB_M^3$ | ........ |
| Z1 | $P_1^{(1,1)}, P_2^{(1,1)}, ..., P_N^{(1,1)}$ | $P_1^{(2,1)}, P_2^{(2,1)}, ..., P_N^{(2,1)}$ | $P_1^{(3,1)}, P_2^{(3,1)}, ..., P_N^{(3,1)}$ | ........ |
| Z2 | $P_1^{(1,2)}, P_2^{(1,2)}, ..., P_N^{(1,2)}$ | $P_1^{(2,2)}, P_2^{(2,2)}, ..., P_N^{(2,2)}$ | $P_1^{(3,2)}, P_2^{(3,2)}, ..., P_N^{(3,2)}$ | ........ |
| Z3 | $P_1^{(1,3)}, P_2^{(1,3)}, ..., P_N^{(1,3)}$ | $P_1^{(2,3)}, P_2^{(2,3)}, ..., P_N^{(2,3)}$ | $P_1^{(3,3)}, P_2^{(3,3)}, ..., P_N^{(3,3)}$ | ........ |

↑ Current Configuration Set for the Machine Parameters

SYSTEM FOR SETTING OPERATING PARAMETERS OF A HARVESTING MACHINE

BACKGROUND OF THE INVENTION

The present invention relates generally to agricultural machinery, especially self-propelled harvesting machines and, more particularly to a system for setting operating parameters of a harvesting machine.

A harvesting machine, such as a combine harvester, is very complex and comprises a large number of machine components with corresponding parameters, which are set by the machine operator. For example, in a combine harvester these machine parameters may include the threshing drum speed, the blower speed, the screen meshes of lower and upper screens, the reel speed, the traveling speed, etc.

The operator of the harvesting machine must set the parameters of the machine components correctly in order to optimally carry out the harvesting operation. There are several different target standards for an optimum harvesting application. For example, one target standard for the harvesting application relates to minimizing losses to the greatest extent possible. On the other hand, in view of the significant time constraints during the short harvesting period, another target standard is to achieve a high throughput or high surface area capacity and thereby harvesting in as short a time as possible. However, the individual target standards are not independent of one another. Thus, for example, there is a correlation between the throughput and the loss. With increasing throughput, there is generally a concurrent increase in loss. Thus the target standard usually is dictated by a compromise between low losses and rapid completion of the harvesting application.

An added difficulty for the machine operator in setting a self-propelled harvesting machine is that, from one harvesting application to the next, there are in each case different external harvesting conditions which require different settings of the parameters of the machine components. For example, it is possible to harvest different crops (wheat, rye, oats, maize, etc.), which may require different operating parameters of the harvesting machine. Other examples of external harvesting conditions are the ripeness of the crop, the grain moisture, the proportion of straw, the straw moisture, the grain size, stand density (yield), etc.

Experienced machine operators who know the effect of external harvesting conditions on the setting of the machine parameters usually succeed in determining the optimal machine settings. For inexperienced operators, however, it is relatively difficult to set the many machine parameters optimally. Even experienced machine operators have problems in setting the harvesting machine optimally at the beginning of the harvesting season.

A system for setting a harvesting machine is proposed in European Patent Application 0 586 99 A2, which is based on a neuronal network. There the external harvesting conditions are detected by sensors and fed to the input neurons of the input layer as signals. The neuronal network serves its concealed layers for information processing and is designed both as a general model of the harvesting machine and as a local model of the machine with respect to individual machine components. The neurons of the output layer in this system then generate the signals for the machine parameters. The realization of such a system for automatically setting a self-propelled harvesting machine based on a neuronal network however requires a very large computing capacity and fast processors. Moreover high expenditure on programming is necessary. These reasons as well as other associated relatively high costs have precluded implementation of a neuronal network in harvesting machines.

It is therefore the object of the invention to provide a relatively inexpensive system which is easy to implement and which allows optimum setting of a self-propelled harvesting machine.

SUMMARY OF THE INVENTION

In accordance with the present invention there is provided a self-propelled harvesting machine for harvesting crops and having one or more machine components with respectively adjustable parameters and taking into account external harvesting conditions; and comprising a system including means for receiving input about external harvesting conditions for respective particular harvesting applications, storage means for storing at least one machine parameter for different external harvesting conditions, and means for accessing the stored machine parameter from the storage means after the input about the respective external harvesting conditions.

Here the stored machine parameters can be called up from the storage means to set the harvesting machine after the system is familiar with the external harvesting conditions.

To arrive at the optimum values for the machine parameters to be stored, the empirical values of good machine operators can be used as guidelines or benchmarks. In the process it is important to determine which machine parameters have been set by them in given external harvesting conditions. Alternatively or additionally the machine parameters to be stored can also be generated by series of measurements and from known correlations.

In a particular embodiment of the invention the system is expanded by an input option of a target standard. As a result, the machine settings can be further optimized and adapted to the respective machine operator.

The system according to the invention can be implemented in harvesting machines in a simple and inexpensive manner without having to emulate the correlations in the harvesting machine according to program by an elaborate system such as a neuronal network for example. The system according to the invention can be mounted on the electronic hardware platform already existing in the harvesting machine (e.g. CEBIS the electronic on-board information system of the firm Claas KGaA of Harsewinkel, Germany), in contrast to the substantially more elaborate and expensive computer hardware or software is necessary for the implementation of a neuronal network. A microcontroller for automation tasks in agriculture is disclosed in pages 92–95 of papers delivered at the International Conference on Agricultural Engineering held in Berlin, Germany, Oct. 24–26, 1990, and which is hereby incorporated by reference.

According to another feature of the present invention there is provided a method of operating a self-propelled harvesting machine which has machine components with respectively adjustable parameters and taking into account external harvesting conditions, including the steps of: inputting the values for the external harvesting conditions into a computer; selecting a target standard for the harvesting application; computing a configuration set of machine parameters which matches the harvesting conditions and the selected target standard; and operating an actuator to adjust the parameter of the machine component correlative to the computed parameter.

The system and method according to the invention ensures optimum setting of the harvesting machine, even with an inexperienced machine operator. Furthermore, the harvesting machine is not operated with a faulty setting well below its capacity. However, for the even experienced machine operator, who is slightly out of practice at the beginning of the harvesting season, the system is certainly advantageous.

BRIEF DESCRIPTION OF THE DRAWINGS

Reference is now made to the drawings which illustrate the best known mode and method of carrying out the invention and wherein the same reference numerals indicate the same or similar parts throughout the several views.

DETAILED DESCRIPTION

Figure 1:
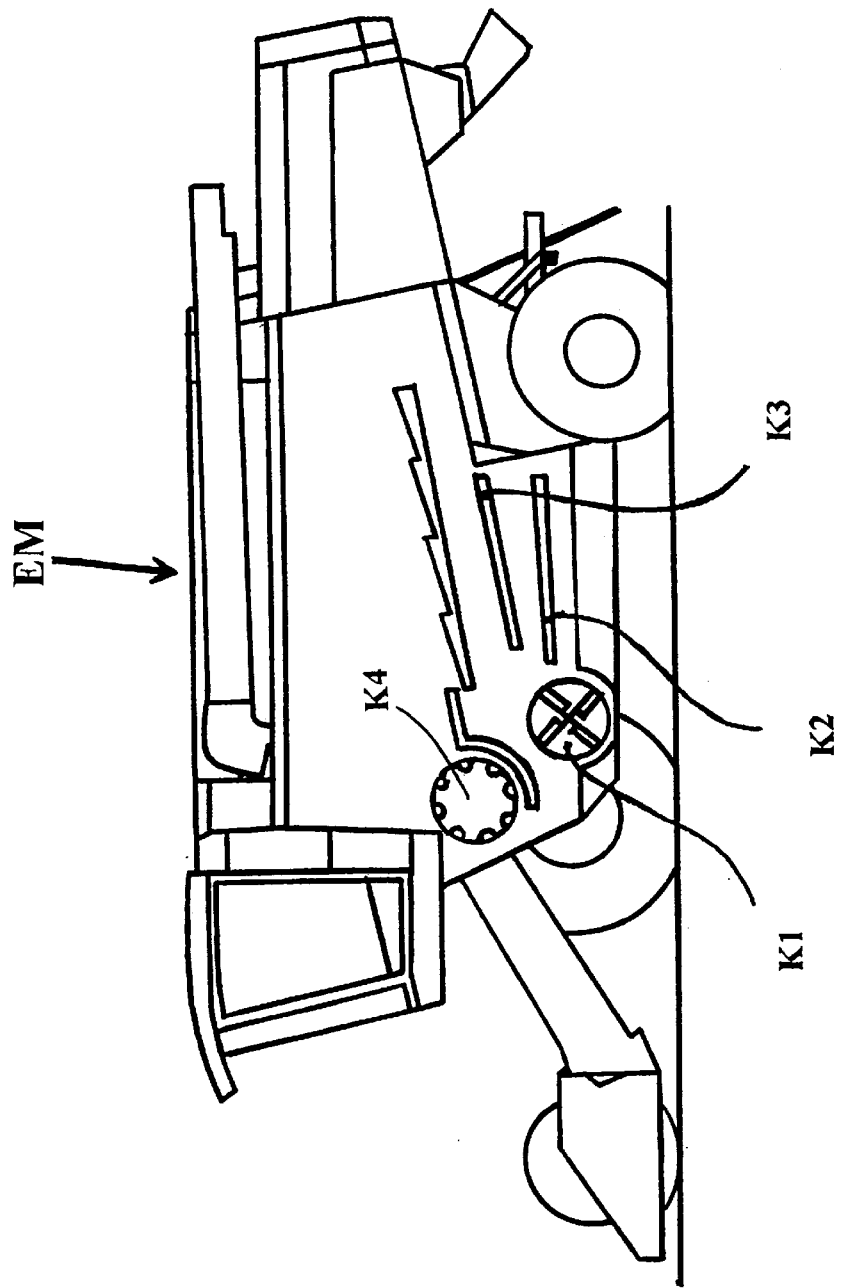
FIG. 1 is a schematic side view of a combine harvester.

FIG. 1 shows a combine harvester EM with different adjustable machine components. For reasons of clarity only some components are shown, including the cleaning blower K1, the upper and lower screens K2, K3 and the threshing drum K4, whose machine parameters (blower speed, screen meshes and threshing drum speed) can be set in each case as a function of different external harvesting conditions in order to obtain a certain harvesting result. It should be understood that the system embodying the invention is not limited to the setting of these machine components nor to combine harvesters, but can be used for any self-propelled harvesting machine with adjustable machine parameters.

Figure 2:
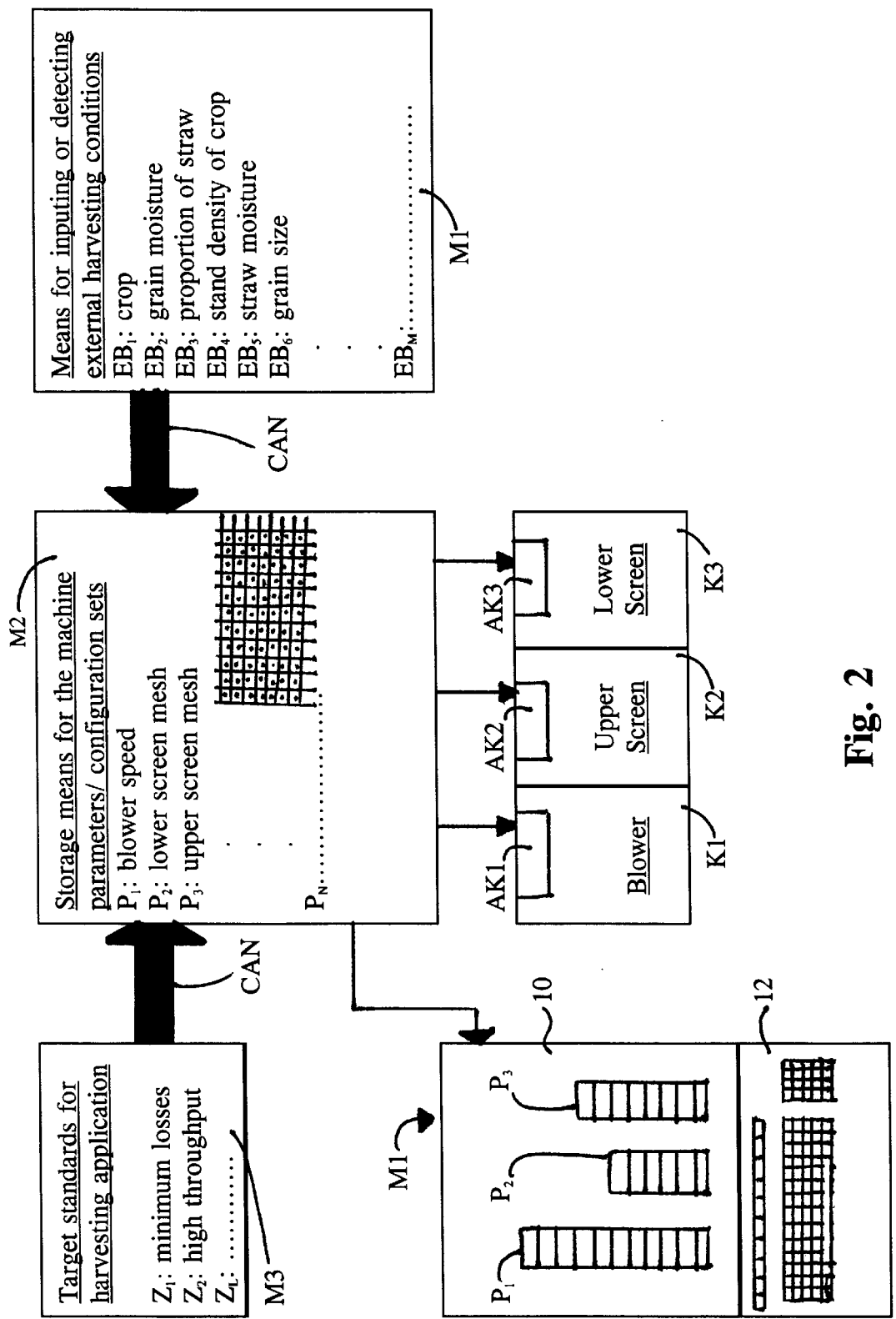
FIG. 2 is a block diagram of a system embodying the invention.

FIG. 2 is a block diagram of a system embodying the invention. Storage means M2 for the machine parameters $P_1$, $P_2$, Y, $P_N$ can be any known storage means such as the hard disk of a computer mounted on the combine harvester EM, an EPROM (erasable programmable read-only memory), an EEPROM (electrically erasable programmable read-only memory) or a chip card. When using a mobile storage means such as the chip card, the machine operators can exchange the configuration data sets with each other.

In a further embodiment the harvesting machines, e.g. EM, are equipped with a remote data transmission system by which the configuration data sets or the settings of the harvesting machine, the target standard and/or the harvesting conditions can be monitored, exchanged or varied by remote scanning.

Figures 3, 4:
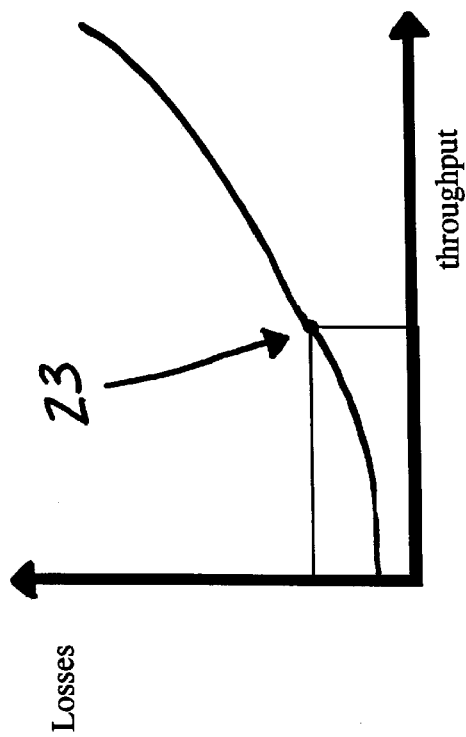
FIG. 3 is an illustration of a table of configurations filed in the storage means with the machine parameters for different constellations of external harvesting conditions and for in each case different target standards relating to the harvesting application.
FIG. 4 is a graph of a loss/throughput characteristic curve.

Preferably in an initialization step, base configuration sets of machine parameters $P_1$, $P_2$, Y, $P_N$ for different harvesting conditions and, if occasion arises, an input M3 of target standards for the harvesting application are delivered via a controller area network (CAN) and stored in the storage means M2 (cf. the table of configurations in FIG. 3). The CAN is advantageously the controller area network specified by Bosch and Intel for the automotive industry. The input can be carried out, for example, by the manufacturer of the harvesting machine or by the machine operator. Furthermore it is provided that the table of configurations can be expanded beyond the base configuration sets by further configuration sets. By way of example, some external harvesting conditions and target standards are listed below. In this case, for one particular embodiment the different harvesting conditions are respectively divided into certain categories (e.g. high, normal, low):

$EB_1^1 = EB_1^2 = EB_1^3 =$ wheat $EB_2^1 =$ high proportion of straw $EB_2^2 =$ normal proportion of straw $EB_2^3 =$ low proportion of straw $EB_3^1 =$ high grain moisture $EB_3^2 =$ normal grain moisture $EB_3^3 =$ low grain moisture $EB_4^1 =$ high grain size $EB_4^2 =$ medium grain size $EB_4^3 =$ low grain size.

These categories can in turn be divided into subcategories, for example very high, extremely high, and others.

Certain categories can likewise be given for the target standards:

$Z_1 =$ minimum losses $Z_2 =$ high throughput $Z_3 =$ compromise operating point on the characteristic curve (loss/throughput)—cf. FIG. 4.

In practice even experienced machine operators under identical external harvesting conditions will select different machine parameters and at the same time arrive at comparably good harvesting results—i.e. the link between given external harvesting conditions for a certain target standard with a certain configuration set of machine parameters is not necessarily unambiguous—it is provided that for certain external harvesting conditions and for a certain target standard it is quite possible to store two or more configuration sets for the machine parameters. Accordingly a machine operator can then store "his optimum setting" in such a way that he recognizes it again as such at any time.

Thus allowance is made for the fact that, owing to the complexity and interactions of the various variable machine components with each other and for the total harvesting result, notwithstanding any number of faulty settings, it is quite possible for there to be several optimum settings. The machine operator can then, without having a sense of patronization, choose his favorite from the stored optimum configuration sets. Therefore, in spite of the possibility of choice, faulty settings of the harvesting machine are avoided.

An individual data field $P_j^{(K,l)}$ in the memory M2 contains at least one value for a given machine parameter $P_N$ as a function of a given grouping (k-index) of external harvesting conditions and if occasion arises a given target standard (I-index) for the harvesting application.

The external harvesting conditions $EB_1$, $EB_2$, Y, $EB_M$ are input preferably by menu control via a monitor 10 and a keyboard 12. The input means M1 here is, for example, the monitor 10 and the keyboard 12 (see FIG. 2). In this case the machine operator calls up the menu item "Input the external harvesting conditions". Then harvesting conditions or categories of harvesting conditions are proposed to the operator of the system, wherein the machine operator, via the keyboard 12 and the CAN, inputs into the system the corresponding harvesting condition or category:

EB1: crop=wheat?
   crop=rye?
   crop=Y?

EB2: high proportion of straw?
   normal proportion of straw?
   low proportion of straw?

EB3: Y

As an alternative to manually inputting the external harvesting conditions and/or as a complement to them, it is provided that the external harvesting conditions are automatically detected by sensors. Thus the machine operator can, for example before commencement of the harvesting application, indicate the crop while other external harvesting conditions are measured in a short "finding phase" by corresponding sensors. Such sensors for analysis of, for example, the proportion of straw or grain moisture are known to the expert. The input means M1 here include the sensors.

The target standards $Z_1$, $Z_2$, Y, $Z_I$, for the harvesting application are input likewise by menu control via keyboard 12 or simply via a rotary switch, for example.

In one embodiment there is provision for weighting of the individual target standards $Z_1$, $Z_2$, Y, $Z_I$. As a result, combinations between individual target standards become possible. By this means improved machine operator adaptation can be achieved and a harvesting machine which operates on a commercial basis can be specially set to customer requirements. Two different customer requirements will be mentioned here as an example. One customer attaches great importance to low losses and the next customer attaches more importance to surface area capacity. By weighting the target standards, such customer-specific adaptations of the harvesting machine are easy to carry out.

The possibility of selecting a stored, customer-specific and/or weighted target standard proves to be particularly advantageous.

In self-propelled harvesting machines there is generally on-board information equipment which contains basic information such as, for example, the number and model of the harvesting machine. Often with the aid of this on-board information equipment there is also the possibility of completing a job order which contains the name of the customer, the surface area cultivated and the type of crop. Some information is therefore available to the operator of the harvesting machine at the beginning of the cultivated field for selection of a target standard or harvesting conditions.

In a further embodiment this existing machine-specific and job-specific information is used by the system according to the invention for selection of the target standard $Z_1$, $Z_2$, Y, $Z_1$, or harvesting condition $EB_1$, $EB_2$, Y, $EB_M$.

Figure 5:
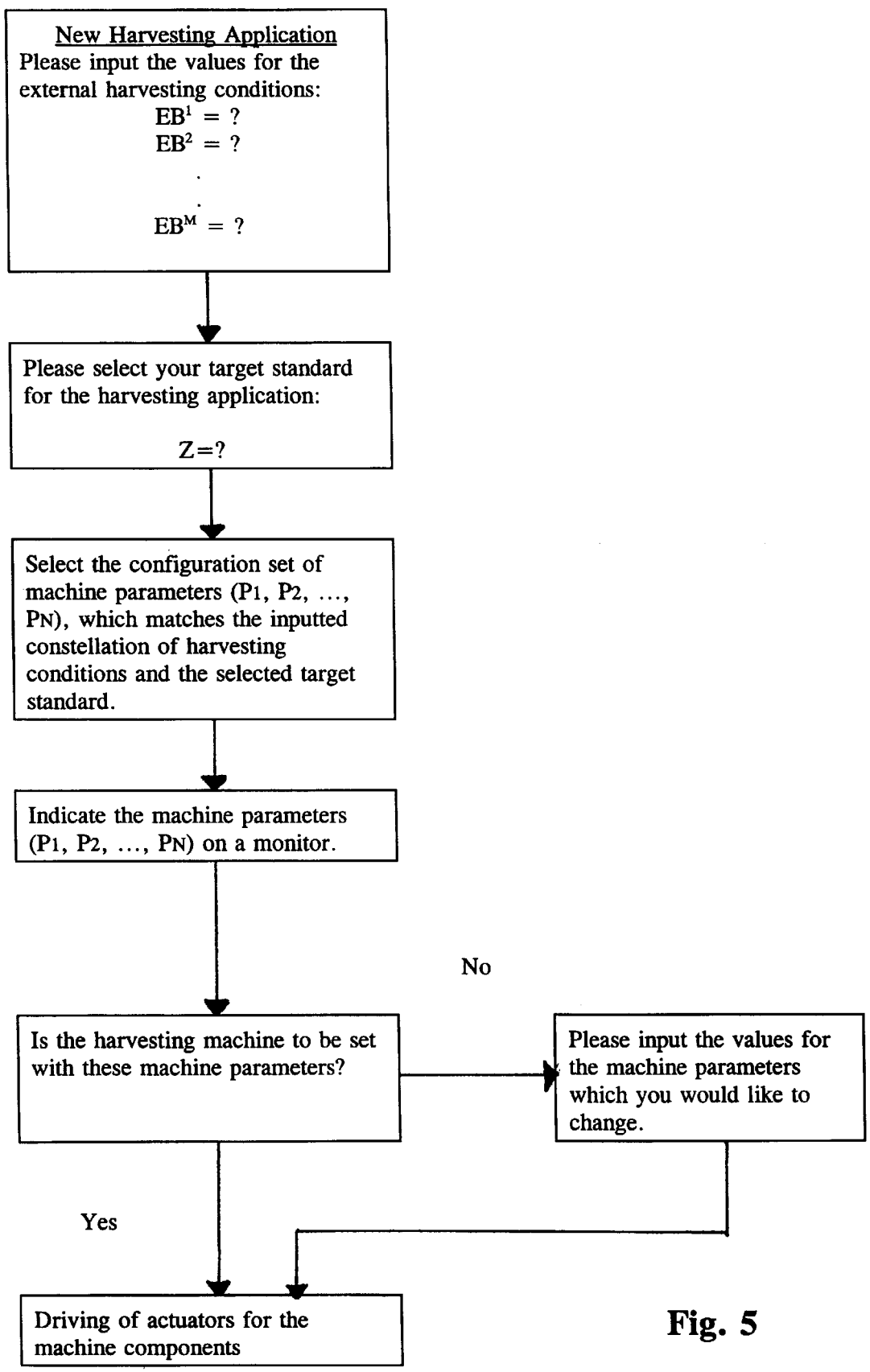
FIG. 5 is a flow chart for setting the harvesting machine according to a method embodying the invention.

After the system stores the harvesting conditions $EB_1$, $EB_2$, Y, $EB_M$ and a target standard selected, if occasion arises $Z_1$, $Z_2$, Y, $Z_I$, a corresponding data field $P_j$, for the machine parameters $P_1$, $P_2$, Y, $P_N$ is selected from the memory M2 (see also the flow chart in FIG. 5). Preferably these machine parameters $P_1$, $P_2$, Y, $P_N$ are indicated on the monitor 10 to the machine operator before setting. In this case the machine operator can decide whether to accept this setting and if necessary perform fine tuning of the proposed machine parameters. Also storage of these individually trimmed machine parameters as an additional configuration set is possible so that the latter is available for further harvesting applications.

After the machine operator has accepted the configuration set, the called-up machine parameters $P_1$, $P_2$, Y, $P_N$ are fed to corresponding actuators $AK_1$, $AK_2$, Y, $AK_N$ as control signals for setting the machine components $K_1$, $K_2$, Y, $K_N$. Such actuators are known to the expert.

The selected harvesting conditions or set target standards are not constant quantities. Thus the harvesting conditions such as for example the grain moisture can also vary greatly within a piece of land. The variation in a harvesting condition or target standard can cause the system according to the simplest embodiment of the invention to propose a new machine setting. This is conveyed to the machine operator in a known manner. Thus the possibility exists of altering the machine setting or carrying on working with the instantaneous setting. In the further embodiment this new proposed machine setting is directly converted to a new machine setting. The harvesting machine thus continually adjusts to the new harvesting conditions or target standards with the aid of the stored values.

The degree of optimization of the system depends mainly on the possible storage capacity of the storage means M2. In the simplest embodiment it is therefore provided that all parameters such as harvesting condition and/or target standard are fixed beforehand and can be selected only with the aid of an input mask which is a simplified keyboard 12.

If the harvesting conditions are automatically detected, the measured values are classified and then fed to the system. Here the classes are selected in such a way that a stored allocation is possible for the respective class.

In another particular embodiment, if a selected or measured value of a target standard or harvesting condition cannot be allocated, a machine setting is generated from the stored values by interpolation or a known correlation.

The system is arranged so that the machine operator, at any time during a harvesting application, is able to manually override individual or all set machine parameters and if necessary store them via keyboard 12.

Other objects, features and advantages will be apparent to those skilled in the art. While preferred embodiments of the present invention have been illustrated and described, this has been by way of illustration and the invention should not be limited except as required by the scope of the appended claims.

I claim:

1. In a self-propelled harvesting machine for harvesting crops and having one or more machine components with respectively adjustable parameters and taking into account external harvesting conditions; the improvement comprising:

a system including means for receiving input about external harvesting conditions for respective particular harvesting applications, storage means for storing at least one machine parameter for different external harvesting conditions, and means for accessing the stored machine parameter from the storage means after the input about the respective external harvesting conditions, wherein said machine parameter is stored while taking into account at least one target standard for the respective harvesting application and is accessed from the storage means to provide a predetermined setting and wherein said at least one target standard includes at least one of a quantity of harvest losses, a quantity of throughput, and a combination of capacity parameters by displacement of characteristic curve.

2. A self-propelled harvesting machine according to claim 1, wherein said target standard is derived from individual target standards and stored in the storage means.

3. In a self-propelled harvesting machine for harvesting crops and having one or more machine components with respectively adjustable parameters and taking into account external harvesting conditions; the improvement comprising:

a system including means for receiving input about external harvesting conditions for respective particular harvesting applications, storage means for storing at least one machine parameter for different external harvesting conditions, and means for accessing the stored machine parameter from the storage means after the input about the respective external harvesting conditions, wherein said machine parameter is stored while taking into account at least one target standard for the respective harvesting application and is accessed from the storage means to provide a predetermined setting and including on-board information equipment, and a means for deriving said target standards from existing machine-specific information obtained at least partially from the on-board information equipment.

4. In a self-propelled harvesting machine for harvesting crops and having one or more machine components with respectively adjustable parameters and taking into account external harvesting conditions; the improvement comprising:

a system including means for receiving input about external harvesting conditions for respective particular harvesting applications, storage means for storing at least one machine parameter for different external harvesting conditions, and means for accessing the stored machine parameter from the storage means after the input about the respective external harvesting conditions and including on-board information equipment, and means for deriving said harvesting conditions from existing machine-specific information obtained at least partially from the on-board information equipment.

5. In a self-propelled harvesting machine for harvesting crops and having one or more machine components with respectively adjustable parameters and taking into account external harvesting conditions; the improvement comprising:

a system including means for receiving input about external harvesting conditions for respective particular harvesting applications, storage means for storing at least one machine parameter for different external harvesting conditions, and means for accessing the stored machine parameter from the storage means after the input about the respective external harvesting conditions, wherein said machine parameter is stored while taking into account at least one target standard for the respective harvesting application and is accessed from the storage means to provide a predetermined setting and including on-board information equipment, and means for deriving said target standards from existing job-specific information obtained at least partially from the on-board information equipment.

6. In a self-propelled harvesting machine for harvesting crops and having one or more machine components with respectively adjustable parameters and taking into account external harvesting conditions; the improvement comprising:

a system including means for receiving input about external harvesting conditions for respective particular harvesting applications, storage means for storing at least one machine parameter for different external harvesting conditions, and means for accessing the stored machine parameter from the storage means after the input about the respective external harvesting conditions including on-board information equipment, and means for deriving said harvesting conditions from existing job-specific information obtained at least partially from the on-board information equipment.

\* \* \* \* \*